US006772357B2

(12) United States Patent
Billick et al.

(10) Patent No.: US 6,772,357 B2
(45) Date of Patent: Aug. 3, 2004

(54) COMPUTER SYSTEM TESTING BY SIMULATING A POWER SUPPLY ENABLE IF POWER SUPPLY GOOD INDICATOR IS NEGATIVE

(75) Inventors: Stephen J. Billick, Austin, TX (US); Ariff Kazmi, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 600 days.

(21) Appl. No.: 09/768,437

(22) Filed: Jan. 24, 2001

(65) Prior Publication Data

US 2002/0099961 A1 Jul. 25, 2002

(51) Int. Cl.[7] .................................................. G06F 1/26
(52) U.S. Cl. ........................ 713/340; 307/140; 702/59; 714/36
(58) Field of Search .......................... 307/140; 702/59; 713/340; 714/36

(56) References Cited

U.S. PATENT DOCUMENTS

| | | | | | |
|---|---|---|---|---|---|
| 4,853,674 A | * | 8/1989 | Kiss | ........................ | 340/407.1 |
| 5,185,881 A | * | 2/1993 | Brooks et al. | ................. | 714/3 |
| 5,239,495 A | * | 8/1993 | Nanno et al. | ................ | 713/321 |
| 5,668,417 A | | 9/1997 | Wiscombe et al. | ........... | 307/64 |
| 5,710,701 A | | 1/1998 | Brown | ........................ | 364/185 |
| 5,796,185 A | * | 8/1998 | Takata et al. | ................ | 307/140 |
| 6,493,770 B1 | * | 12/2002 | Sartore et al. | .................. | 710/8 |

OTHER PUBLICATIONS

"Power Supply Specification 200Watt Standard With PFC"; Title: PWR SPLY, 200W, PFC, 3.3V, 20PN, 2A; DWG No.: 79WPJ; 31 pages (Dell Computer Corporation).

* cited by examiner

Primary Examiner—Thomas Lee
Assistant Examiner—Albert Wang
(74) Attorney, Agent, or Firm—Haynes and Boone, LLP

(57) ABSTRACT

A technique for isolating and indicating faults or defects in a personal computer system. The personal computer includes a power supply system with an internal fault detector and an enabling input that, when active, instigates the power supply fault detection procedure. In normal operation, an enabling signal is applied to the enabling input when the computer ON/OFF control is activated and when other aspects of the personal computer system have been determined to be operational. A mechanism for simulating an enabling signal and an indicator driven by the power supply fault detector permit fault indications to be localized as existing either in the power supply or elsewhere in the PC system.

28 Claims, 4 Drawing Sheets

COMPUTER SYSTEM TESTING BY SIMULATING A POWER SUPPLY ENABLE IF POWER SUPPLY GOOD INDICATOR IS NEGATIVE

BACKGROUND

This disclosure relates generally to fault-detection and fault-isolation techniques for electronic equipment and, more particularly, to a technique for detecting and isolating faults or defects related to the operation of a power supply in a personal computer system.

Computer systems in general and personal computer systems in particular have attained widespread use within many segments of today's society, and may be viewed as information handling systems that afford independent computing power to one user or to a plurality of users. A personal computer system can conveniently be classified as a desktop, floor standing, or portable microcomputer.

A personal computer system will likely include one or a plurality of peripheral devices that are coupled to the system processor and that perform specialized functions. Examples of peripheral devices include modems, sound and video devices or specialized communication devices. Mass storage devices such as hard disks, CD-ROM drives and magneto-optical drives are also considered peripheral devices.

FIG. 3 is a block diagram of an exemplary computer system 300. The computer system depicted in FIG. 3 is seen to include a microcomputer that includes a microprocessor (or simply "processor") 310, associated main memory 350 and control logic and a number of peripheral devices 330, 387, 391 that provide input and output for the system 300. A typical computer system 300 includes a power supply 110 connected to a voltage regulator 315 providing power to the processor 310. Peripheral devices shown in FIG. 3 include keyboards 391, graphics devices 330, and traditional I/O devices 387 that often include display monitors, mouse-type input devices, floppy and hard disk drives, CD-ROM drives and printers.

The number and kinds of peripheral devices that are appended to personal computers continue to expand. For example, many computer systems also include network capability, terminal devices, modems, televisions, sound devices, voice recognition devices, electronic pen devices, and mass storage devices such as tape drives, CD-R drives or DVDs. The peripheral devices usually communicate with the processor over one or more buses 320, 360, 380, with the buses communicating with each other through the use of one or more bridges 340 and 370.

One skilled in the art will recognize that the foregoing components and devices are used as examples for sake of conceptual clarity and that various configuration modifications are common. For example, the processor 310 is used as an exemplar of any general processing unit, including but not limited to multiprocessor units; host bus 320 is used as an exemplar of any processing bus, including but not limited to multiprocessor buses; and host-to-PCI bridge 340 and PCI-to-ISA bridge 370 are used as exemplars of any type of bridge.

PC systems typically include a system board to interconnect system components and peripheral devices and include a power supply to provide specified DC output voltages to system components and peripherals. For example, the power supply in a desktop computer typically converts 110 volts AC to various DC voltages that are distributed to PC subsystems and peripherals. Typically, 3.3 VDC may be provided to a modem, 5.0 VDC to a hard drive, and 12.0 VDC to a CD-ROM drive. FIG. 2 is a rendition, in block diagram form, of a conventional power supply system 200, such as may readily be used with PC systems. Power supply 110 converts a nominal 110-volt AC input at terminals 220 and 221 to a plurality of DC voltage outputs at terminals 230, 240 and 250. Power supply 110 incorporates a self-test procedure that is initiated when a predetermined signal is applied to an input terminal 160. In practice, the required signal may appear between terminal 160 and system ground (GND) 180. In general, if the self-test procedure indicates that the power supply performance complies with predetermined criteria, an appropriate signal indicating such compliance is caused to appear at output terminal 150.

Specifically, it is common that commercially available power supply systems undertake the self-test function during the PC start-up process. The self-test procedure is often initiated by applying a predetermined voltage to a Power Supply Enable ($PS_E$) input, or the equivalent, on the power supply. In one embodiment, the necessary voltage may be, for example, a logic-level ZERO. Power supply self-test is largely defined by the operation of a fault detector in the power supply. For the purposes of this Description, it may be assumed that the fault detector measures each of the power supply output voltages to determine whether those voltages reside within respective specified predetermined ranges, ±5% being commonplace. If the observed output voltages comply with this specification, then the fault detector will issue an affirmation that no fault exists within the power supply. The affirmation may take the form of a logic-level ZERO at the output of the fault detector, but other prescribed outputs may be encountered. The output of the fault detector is routed from the power supply through a connector to the PC system board. This signal, which may be colloquially referred to as the PS Good ($PS_G$) output of the power supply, is then used to drive an indicator, usually a light-emitting diode (LED). Power supplies that operate generally as described above are commercially available from Lite-On Electronics, Inc., Milpitas, Calif. (Model #PS-520-7D), and from Delta Electronics, Taipei, Taiwan (Model # NPS-200PB-73). Activation of the LED serves as an indication that the power supply is operating, as is the entire PC. Conversely, failure of the LED to light may justify an inference that the power supply, or some other aspect of the PC, is not operative.

However, failure of the LED indicator to light cannot be conclusively taken as confirmation that the power supply is itself defective. The ambiguity derives from an existing PC design in which the $PS_E$ input to the power supply is generally contingent on the combination of a number of inputs to logic circuitry that generates the $PS_E$ signal. Simply, a power-supply-enabling $PS_E$ input becomes available only when the PC ON/OFF control has been activated, and when selected other PC components, subsystems, or peripherals have been determined to be operating properly. Therefore, failure of the LED indicator to light may be taken to indicate a fault or defect, but does not serve to specifically localize the defect. This uncertainty is, of course, an impediment to a troubleshooting and repair process. Clearly, if a defect could be confidently isolated to the power supply, then a malfunctioning PC could be returned to operation simply be replacing a defective power supply. On the other hand, if the fault is not able to be localized to the power supply, the entire PC may need to be taken out of service for repair, perhaps for an unnecessarily extensive duration.

Accordingly, what is desired is a simple, expedient and effective mechanism for isolating faults in a PC.

Specifically, the mechanism should confidently determine whether the cause of an inoperative PC resides within the PC power supply or may be found elsewhere. Currently, a user has no means to accurately determine when a power supply system has failed. An indicator associated with the self-test function may respond indiscriminately to the failure of a power supply or, alternatively, to the grounding of the system board due to unrelated causes. When a power supply system fails, the user (or a repair technician) must isolate each component from the circuit and connect each component to the indicator using a jumper or other connector. Only after a repair technician isolates and tests the power supply can the repair technician determine whether failure of the indicator to illuminate, or otherwise provide an affirmative indication, is due to a fault in the power supply or a fault in the system board.

Accordingly, aspects of the disclosure allow a user or repair technician to immediately and accurately distinguish between the failure of a power supply and a failure of a system board. In addition, a user or repair technician may initiate self-test of a power supply and to observe an indicator to determine if a power supply has failed. The above advantages allow the user or repair technician to identify the failure of a power supply without having to transport the computer system to a repair facility. Other advantages allow a user to determine whether a power supply has failed without removing a computer casing or otherwise disassembling the computer. Efficient discrimination between the failure of a power supply and the failure of the system board allows a user or repair technician to immediately identify the necessary replacement components, and to reduce the need for separately dispatching repair parts.

SUMMARY

The above and other objects, advantages and capabilities are achieved in one aspect of the disclosure in a testing method for a personal computer that incorporates (i) and ON/OFF control, (ii) a power supply having a fault detector, a $PS_E$ input, and a $PS_G$ output coupled to the fault detector, (iii) an enabling circuit having a plurality of inputs, at least one of which is coupled to the ON/OFF control, the enabling circuit for providing an enabling signal at the $PS_E$ input of the power supply, and (iv) an indicator coupled to the $PS_G$ output. The method comprises engaging the ON/OFF control, observing the indicator, and if the indicator does not provide a positive indication, simulating an enabling signal at the $PS_E$ input of the power supply.

In another aspect, a fault-isolation apparatus in a personal computer comprises a power supply having a $PS_E$ input, a $PS_G$ output and a fault detector coupled to the $PS_G$ output; an indicator coupled to the $PS_G$ output; and an ON/OFF control. A power supply enabling circuit has a plurality of inputs, one of which is coupled to the ON/OFF control, and has an output for providing an enabling signal to the $PS_E$ input of the power supply. The apparatus also includes means coupled to the $PS_E$ input of the power supply for simulating an enabling signal.

In a further aspect, for use in a personal computer that includes an ON/OFF control and that includes an enabling circuit having a plurality of inputs, at least one of which inputs is coupled to the ON/OFF control, and having an output for providing an enabling signal, a power supply comprises a $PS_E$ input coupled to the enabling circuit; a fault detector; a PSG output coupled to the fault detector; and testing means coupled to the $PS_E$ input of the power supply for simulating an enabling signal.

In an additional aspect, a personal computer comprises a system board; a connector that is coupled to the system board and that has a plurality of contacts; an ON/OFF control coupled to a connector contact; a power supply having a $PS_E$ input, a $PS_G$ output and a fault detector coupled to the $PS_G$ output; and an indicator coupled to the $PS_G$ output. A power supply enabling circuit is disposed on the systems board and has a plurality of inputs, one of which is coupled through a connector contact to the ON/OFF control, and has an output for providing an enabling signal through a connector contact to the $PS_E$ input of the power supply. Also includes is means coupled through a connector contact to the $PS_E$ input of the power supply for simulating an enabling signal.

BRIEF DESCRIPTION OF THE DRAWINGS

The present disclosure may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
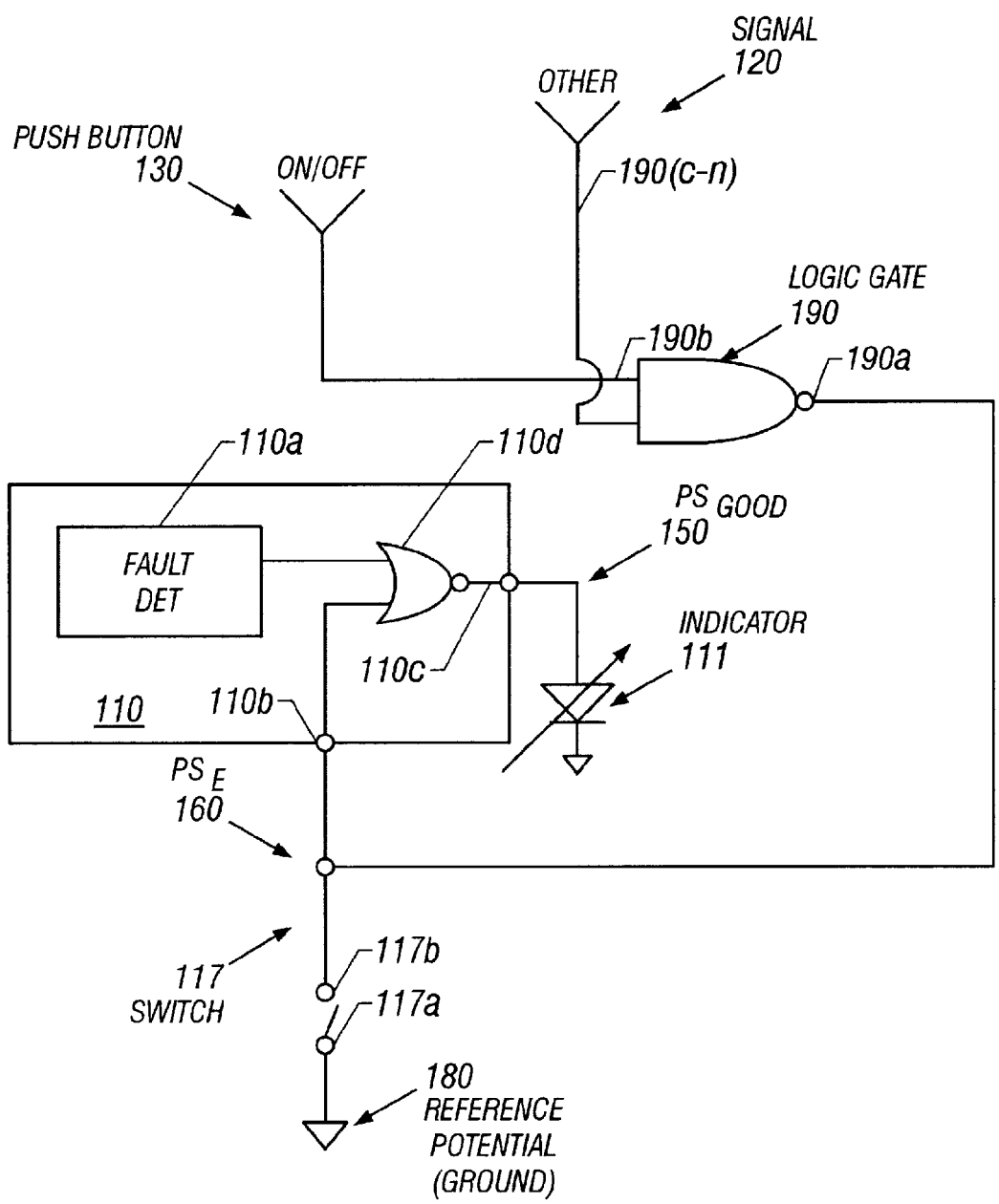
FIG. 1. is a schematic diagram, partially in block form, of an embodiment of the disclosure.
Figure 2:
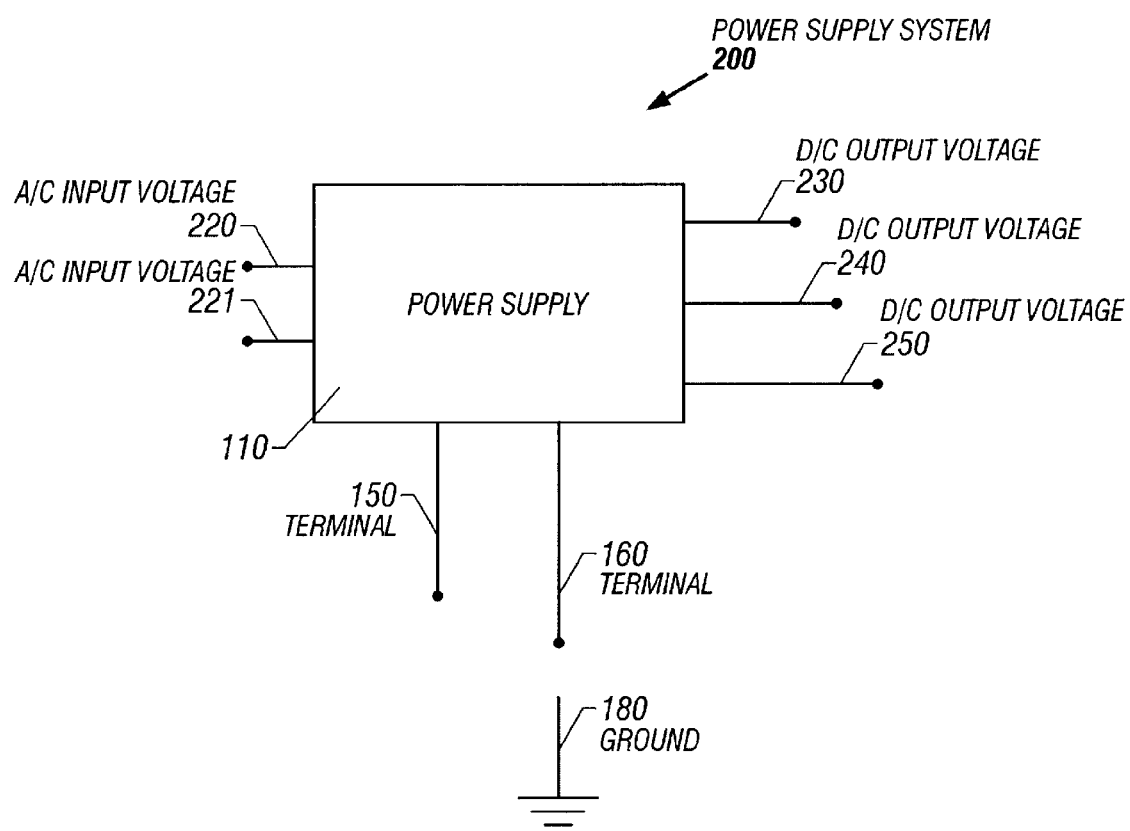
FIG. 2. is a block diagram of a conventional power supply system.
Figure 3:
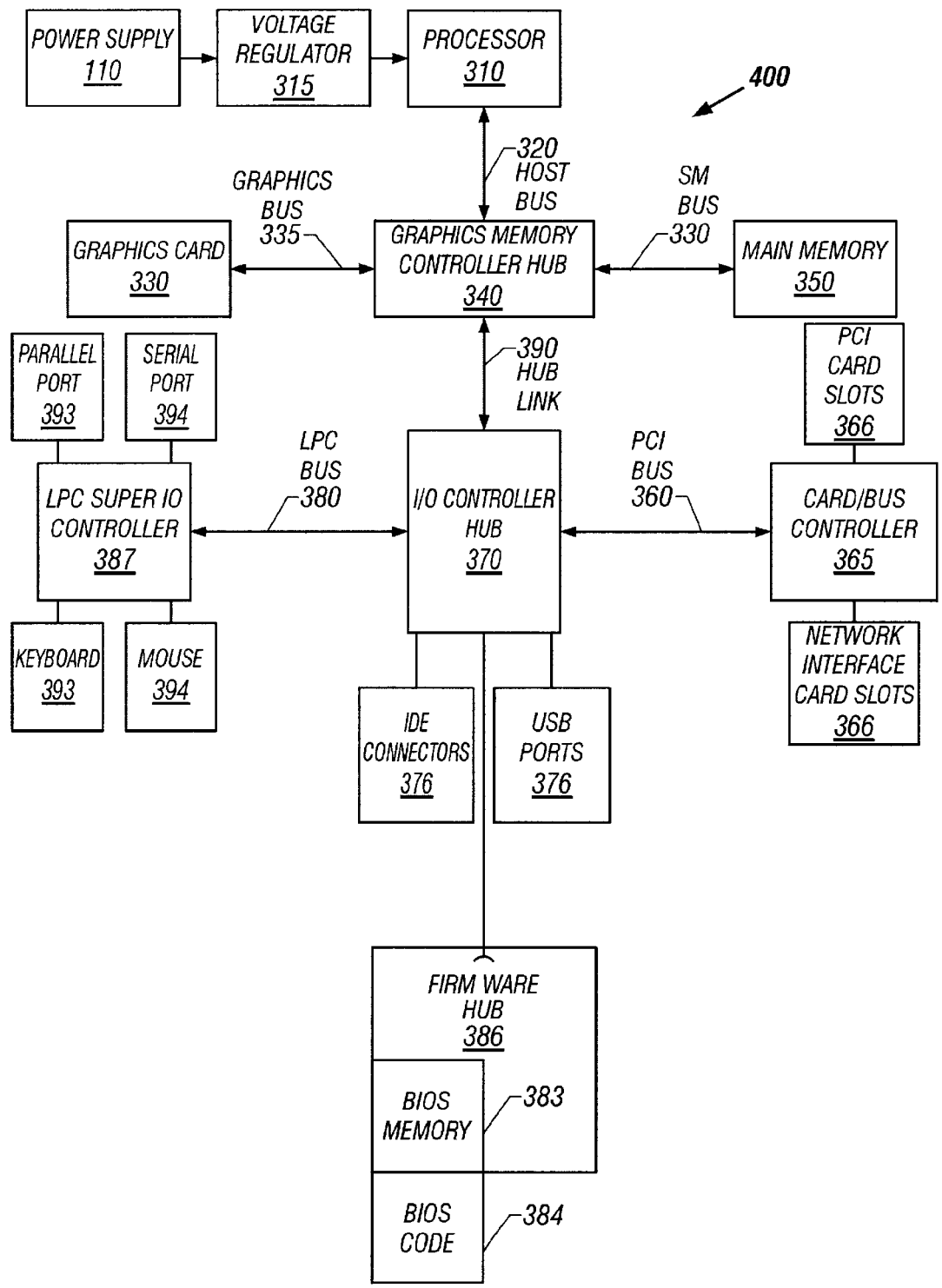
FIG. 3. is a schematic diagram of a computer system into which the subject fault isolation system may be incorporated.

Referring now to FIG. 1, depicted therein is a fault-isolation and fault-detection apparatus for use, inter alia, in a personal computer system. The apparatus includes a power supply 110 that itself includes a fault detector 110a, a Power Supply Enable ($PS_E$) input 110b, and a Power Supply Good ($PS_G$) output 110c. The output of fault detector 110a is coupled to the $PS_G$ output of power supply 110, in one embodiment through logic gate 110d. The $PS_E$ input to the power supply 110 is also coupled to the logic gate 110d.

In the embodiment of FIG. 1, logic gate 110d is a dual-input NOR gate, but other logic configurations may be dictated by the respective polarities of the $PS_E$ input, $PS_G$ output, and the output of fault detector 110a. In general, fault detector 110a operates to measure the voltages at the various voltage outputs (not shown in FIG. 1) of power supply 110. When the observed voltages reside within predetermined respective ranges, the fault detector provides an output signal at its $PS_G$ output that signifies that no fault exists in the power supply. For purposes of this Description, it may be assumed that fault detector 110a provides a logic-level ZERO at its output when no out-of-range condition is detected at any power supply voltage output, and provides a logic-level ONE otherwise.

In an exemplary embodiment, power supply 110 is enabled when a logic-level ZERO is applied at input 110b. Again, for pedagogical purposes, $PS_G$ output 110c is assumed to be positive when a logic-level ONE appears at that output. Given the above-stated conventions, and because the output of the fault detector and the $PS_E$ input to the power supply are NORed in logic gate 110d, a positive (logic-level ONE) output will appear at output 110c only when the fault detector determines that no fault exists (so that a logic-level ZERO appears at the corresponding input of gate 110d) and when a $PS_E$ signal (logic-level ZERO) is applied to input 110b and from there to the other input of gate 110d. When a positive signal, in this embodiment a logic-level ONE, appears at output 110c, indicator 111 provides an affirmative indication through the radiation of visible light. In the embodiment of FIG. 1, indicator 111 is exemplified in a light-emitting diode (LED), but other forms of indicators, visual or otherwise, are contemplated by the disclosure.

By way of reiteration, an affirmative indication can appear at output 110c only when there exists no fault in the power supply, as determined by fault detector 110a, and when the power supply is enabled by the application of a logic-level ZERO at the $PS_E$ input 110b of the power supply. In this regard, an enabling signal may be provided at input 110b through the operation of an enabling circuit, in the form of logic gate 190. In order to simplify this Description, the power supply enabling circuit is instantiated as a NAND gate with a plurality of inputs. Operation of the enabling circuit proceeds as follows.

With continuing reference to FIG. 1, one of the inputs to logic gate 190 is supplied by the PC ON/OFF control 130. When the PC user, or technician, engages the ON/OFF control, as by, for example momentarily depressing a push button on the PC cabinet, a logic-level ONE is caused to appear at input 190b of logic gate 190. Concurrently, numerous disparate other signals are coupled to the other inputs 190(c–n) of logic gate 190. The other signals derive from other functions in the PC system and are taken as indications that, for example, the CPU, various memory components, other PC subsystems, and selected peripherals have been respectively determined to be operating properly.

Consequently, when the ON/OFF control has been engaged and all other observed PC functions have been assessed to be operative, a logic-level ZERO will propagate to output 190a of logic gate 190. From output 190a of logic gate 190, the logic-level ZERO will be coupled to the $PS_E$ input of power supply 110. With the power supply enabled and an affirmative output (logic ZERO) provided by fault detector 110a, a logic ONE will appear at output 110c, and the LED indicator 111 will be activated. However, if LED 111 fails to light, then the PC user, or troubleshooting technician, will know a fault resides somewhere in the PC system. Nevertheless, armed with only this information, the technician will conclude that the origin of the fault is indeterminate. That is, the user or technician will not know whether the fault is confined to the power supply itself, or resides elsewhere in the PC system. Clearly, effective remediation of the origin of the fault or defect will be impossible until the fault is localized. In particular, it would be helpful to know whether the fault is confined to the power supply, thereby suggesting replacement and/or repair of the defective power supply.

The disclosure contemplates a response to the fault-isolation dilemma, in the form of a testing means that is coupled to the $PS_E$ input 110b of power supply 110. In a manner that will be apparent imminently, the testing means operates to simulate a $PS_E$ input to the power supply. In one embodiment, the testing means takes the form of a manually-operable switch 117 coupled between the $PS_E$ input of the power supply and a reference potential (GND). Activation of switch 117 causes the switch, which is normally open, to become closed, so that contact 117a is connected to contact 117b. Therefore, the $PS_E$ input of the power supply will be pulled to GND, and a logic ZERO will appear at the $PS_E$ input. In this manner, closure of the switch is seen to effectively simulate the application of an enabling signal from enabling circuit 190 to input 110b. That is, closure of switch 117 overrides the output of the enabling circuit, at least to the extent that a logic ONE would otherwise have appeared at the $PS_E$ input. Accordingly, if switch 117 is GNDed and indicator 111 continues to decline to provide an affirmative indication at output 110c, then it may reasonably be concluded that a fault exists in power supply 110. Alternatively, if activation of switch 117 causes LED 111 to emit, then it may reasonably be assumed that no fault exists in the power supply and the fault or defect lives elsewhere in the PC system. If there were a fault condition in the power supply, fault detector 110a would have presented a logic-level ZERO at the input of NAND gate 110d, and $PS_G$ output of the power supply would be held to a logic ZERO, irrespective of the existence of a simulated enabling signal at the $PS_E$ input.

Although the disclosure has been described above specifically with respect to the embodiment of FIG. 1, those skilled in the art recognize that the disclosure extends beyond the literal scope of the Description above and as depicted in FIG. 1. For example, switch 117 may be replaced by, and should be deemed equivalent to, any structure that effects simulation of a power supply enabling signal at input 110b of the power supply. As a rudimentary alternative, switch 117 may be replaced by a simple temporary jumper connection between the $PS_E$ input and GND. Similarly, the enabling signal is not restricted to a logic ZERO, but may be a logic ONE or a voltage within a predetermined range.

In addition, indicator 111 need not be an LED and, in fact, indicator 111 need not be a visual indicator. What is pertinent to the invention, however, is that there be enabled a method of testing a personal computer and that the test method be compatible with a personal computer power supply that incorporates fault detection and an indicator driven, at least in part, by the results of the power supply fault detection. The particular algorithm that governs power supply fault detection does not delimit the invention. That is to say, the invention comprehends fault detector operation that is predicated on a requirement other than that power supply output voltages inhabit predetermined specified ranges. Central to the test method is the simulation of an enabling signal at a $PS_E$ input of the power supply.

The method implicitly recognizes that in normal operation the power supply is enabled, vel non, according to a computation performed by an enabling circuit that is, in turn, driven by a plurality of inputs separate from the power supply. That is, a power supply enabling signal, $PS_E$, is generated only when the ON/OFF control 130 has been engaged and the other relevant inputs to the enabling circuit have assumed the necessary respective states, presumably indicating that other PC subsystems (CPU, memory, hard disk, keyboard, etc.) have been determined to be operative. Accordingly, when the enabling circuit provides an enabling signal to the $PS_E$ input and the fault detector indicates that no fault exists in the power supply, the appearance of a logic ONE at the $PS_G$ output will cause the indicator to provide a positive indication, that is, emit light. Conversely, if the enabling circuit declines to provide an enabling signal at the $PS_E$ input (so that the voltage there remains at a logic ONE), presumably because one of the inputs to the enabling circuit indicates a failure in a respective PC subsystem, then the indicator will provide a positive indication only if (i) the fault detector determines that no fault exists in the power supply and (ii) a simulated enabling signal is applied at the $PS_E$ input. Of course, the power supply will provide a negative indication at its $PS_G$ output, and the indicator will not emit, whenever that fault detector detects a fault, irrespective of whether (i) the enabling circuit provides an enabling signal to the $PS_E$ input or (ii) the testing means (switch 117 or the like) simulates an enabling signal.

As should be readily apparent from the Description insofar set out above, operation of the embodiment is predicated on the detection, generation and combination of various signals that originate from, or must be distributed to, numerous disparate components and locations within the PC enclosure. These signals include, for example, the ON/OFF control that originates typically from the PC enclosure, the $PS_E$ signal that originates from the enable circuit on the system board and must be routed to the power supply, the $PS_G$ signal that originates at the power supply and is coupled to the LED indicator, and the simulated enable signal that is applied to the $PS_E$ input of the power supply to in the course of a troubleshooting and fault isolation process. Accordingly, an aspect of the disclosure addresses an implementation that effects the necessary distribution of those signals. In one embodiment, represented in FIG. 4, relevant signals are routed from their respective origins, through a connector 41, to the necessary destinations. Connector 41 has numerous contacts, 41a, 41b, . . . 41n, and may be conveniently positioned on, and coupled to various conductors and components included on the system board 42.

Figure 4:
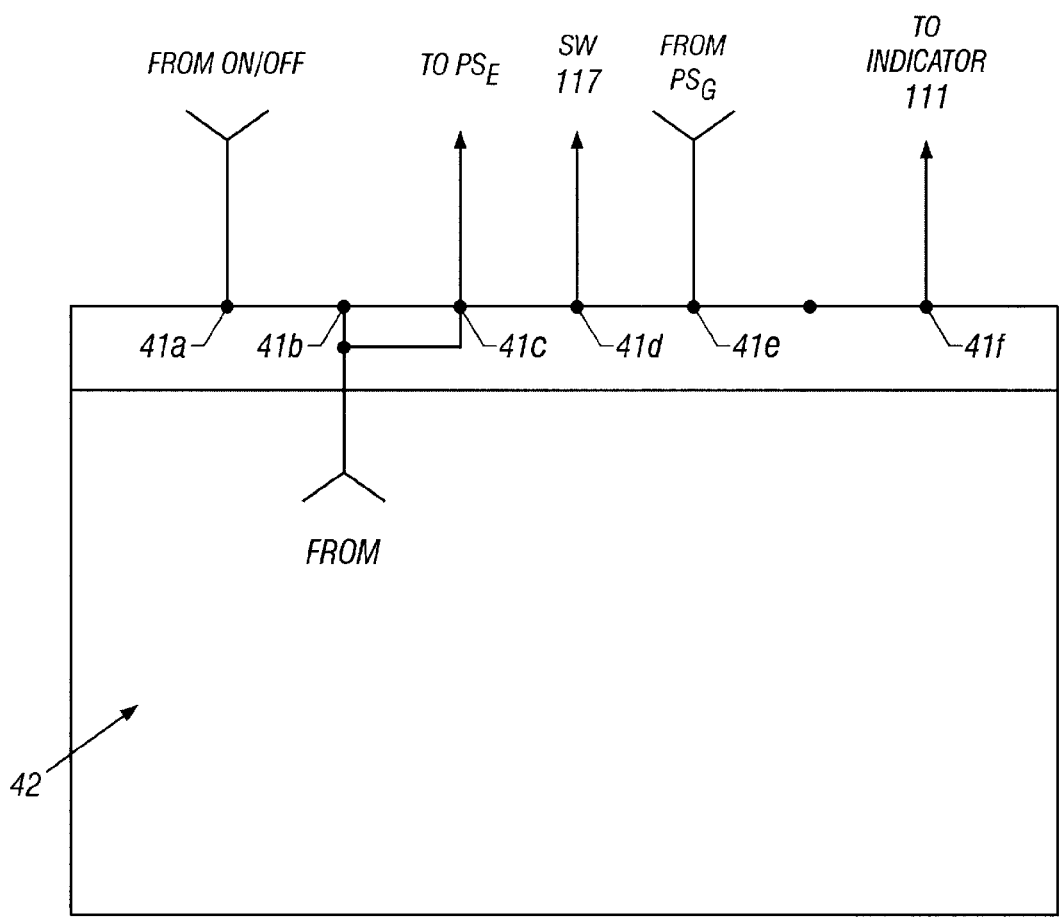
FIG. 4. is a representation of a connector, coupled to the PC system board, through which signals relevant to the operation of the subject disclosure may be distributed.

As may be seen in FIG. 4, ON/OFF control 130 is coupled to a contact 41a on connector 40, and from there to input 190b of enabling circuit 190. Output 190a of the enabling circuit is coupled to connector 41 at a contact 41b, and the $PS_E$ input to power supply 110 is similarly coupled to contact 41c. Contact 41d is coupled to one terminal of switch 117. The $PS_G$ output of power supply 110 is coupled to contact 41e, and indicator 111 is coupled to contact 42f. As is easily understood, interconnections between the contacts of connector 41 may be alternatively made through conductive traces on the system board, or through connections integral to the connector itself.

While particular embodiments of the present invention have been shown and described, it will be recognized to those skilled in the art that, based upon the teachings herein, further changes and modifications may be made without departing from this disclosure and its broader aspects, and thus, the appended claims are to encompass within their scope all such changes and modifications as are within the true spirit and scope of this invention, as well as all embodiments that are equivalent to embodiments described with particularity herein.

For example, signals provided or used by various components included in, or collateral to, embodiments described herein have been characterized with specificity. To wit: the $PS_E$ input to power supply 110 has been described as active when it assumes a logic ZERO; fault detector 110 has been described as providing an affirmative output (indicating no fault or defect) in the form of a logic ZERO; and the $PS_G$ output of power supply 110 must assert a logic ONE in order to activate indicator 111. However, the scope of the invention is not to be limited to the magnitudes, polarities, or other characteristics of those signals. In addition, although the fault detector is described herein as conforming to a procedure in which only the power supply output voltages are monitored, the invention also comprehends fault-detection procedures that operate according to additional or different criteria. Similarly, the disclosure is not limited to a $PS_E$ simulation signal that is activated by a switch or by jumper to GND, and any action applied to the input to the power supply that initiates operation of the fault detector, in the absence of the normally requisite output of enabling circuit 190, suffices.

What is claimed is:
1. In a personal computer system that includes:
(i) an ON/OFF control,
(ii) a power supply having a $PS_E$ input. a fault detector and a $PS_G$ output coupled to the fault detector,
(iii) an enabling circuit having a plurality of inputs, at least one of which is coupled to the ON/OFF control, the enabling circuit for providing a logic level signal at the $PS_E$ input of the power supply, and
(iv) an indicator coupled to the $PS_G$ output, a testing method comprising:
(a) engaging the ON/OFF control,
(b) observing the indicator, and
(c) if the indicator does not provide a positive indication,
simulating a logic level signal at the $PS_E$ input of the power supply.
2. A method as defined in claim 2, wherein the logic-level signal is applied manually.
3. A method as defined in claim 2, wherein the logic-level signal is applied by activating a switch that is coupled between the $PS_E$ input and a reference potential.
4. A method as defined in claim 2, wherein the logic-level signal is applied by connecting a jumper between the $PS_E$ input and a reference potential.
5. A method as defined in claim 1, further comprising, subsequent to the simulation of a logic level signal at the $PS_E$ input of the power supply, observing the indicator and, if the indicator continues to not provide a positive indication, inferring that the power supply likely contain a fault.
6. A method as defined in claim 5, wherein the logic-level signal is applied manually.
7. A method as defined in claim 6, wherein the logic-level signal is applied by activating a switch that is coupled between the $PS_E$ input and a reference potential.
8. A method as defined in claim 6, wherein the logic-level signal is applied by connecting a jumper between the $PS_E$ input and a reference potential.
9. In a personal computer, a fault detection/isolation apparatus comprising:
a power supply having a $PS_E$ input, a $PS_G$ output and a fault detector coupled to the $PS_G$ output;
an indicator coupled to the $PS_G$ output;
an ON/OFF control;
a power supply enabling circuit having a plurality of inputs, one of which is coupled to the ON/OFF control, and having an output for providing a logic level signal to the $PS_E$ input of the power supply; and means coupled to the $PS_E$ input of the power supply for simulating a logic level signal.
10. A fault-isolation apparatus as defined in claim 9, wherein the means for simulating a logic level signal is manually operable.
11. A fault-isolation apparatus as defined in claim 10, wherein the means for simulating a logic level signal comprises a switch coupled between the $PS_E$ input of the power supply and a reference potential.
12. A fault-isolation apparatus as defined in claim 10, wherein the means for simulating a logic level signal is a jumper wire.
13. In a personal computer that includes an ON/OFF control and that includes an enabling circuit having a plurality of inputs, at least one of which inputs is coupled to the ON/OFF control, and having an output for providing a logic level signal, a power supply comprising:
a $PS_E$ input coupled to the enabling circuit;

a fault detector;

a PSG output coupled to the fault detector; and testing means coupled to the $PS_E$ input of the power supply for simulating a logic level signal.

14. A power supply as defined in claims 13, wherein the means for simulating a logic level signal is manually operable.

15. A power supply as defined in claim 14, wherein the means for simulating a logic level signal comprises a switch coupled between the $PS_E$ input of the power supply and a reference potential.

16. A power supply as defined in claim 14, wherein the means for simulating a logic level signal is a jumper wire.

17. A power supply as defined in claim 13, further comprising:

an indicator coupled to the $PS_G$ output of the power supply, the indicator operative to provide a positive indication when (i) the enabling circuit provides a logic level signal at the $PS_E$ input of the power supply AND (ii) the fault detector indicates that no fault exists in the power supply.

18. A power supply as defined in claim 13, wherein the indicator is operative to provide a positive indication when (i) the enabling circuit declines to provide a logic level signal at the $PS_E$ input of the power supply AND (ii) the testing means simulates a logic level signal at the $PS_E$ input of the power supply AND (iii) the fault detector indicates that no fault exists in the power supply.

19. A power supply as defined in claim 13, wherein the power supply is operative to provide a negative indication when the fault detector indicates that a fault exists in the power supply, irrespective of whether (i) the enabling circuit provides a logic level signal to the $PS_E$ input of the power supply OR (ii) the testing means simulates a logic level signal at the $PS_E$ input of the power supply.

20. A personal computer comprising:

a system board;

a connector coupled to the system board and having a plurality of contacts;

an ON/OFF control coupled to a connector contact;

a power supply having a $PS_E$ input, a $PS_G$ output and a fault detector coupled to the $PS_G$ output;

an indicator coupled to the $PS_G$ output;

a power supply enabling circuit disposed on the systems board and having a plurality of inputs, one of which is coupled through a connector contact to the ON/OFF control, and having an output for providing a logic level signal through a connector contact to the $PS_E$ input of the power supply; and means coupled through a connector contact to the $PS_E$ input of the power supply for simulating a logic level signal.

21. A personal computer as defined in claim 20, wherein the means for simulating a logic level signal is manually operable.

22. A personal computer as defined in claim 21, wherein the means for simulating a logic level signal comprises a switch coupled between the $PS_E$ input of the power supply and a reference potential.

23. A personal computer as defined in claim 21, wherein the means for simulating a logic level signal is a jumper wire.

24. The method of claim 21 further comprising:

determining there is a fault with the power supply if the logic level signal is simulated and the indicator continues to provide a negative indication.

25. The method of claim 21 further comprising:

determining there is no fault with the power supply if the logic level signal is simulated and the indicator provides a positive indication.

26. A personal computer as defined in claim 20, wherein the indicator is operative to provide a positive indication when (i) the enabling circuit provides a logic level signal at the $PS_E$ input of the power supply AND (ii) the fault detector indicates that no fault exists in the power supply.

27. A personal computer as defined in claim 20, wherein the indicator is operative to provide a positive indication when (i) the enabling circuit declines to provide a logic level signal at the $PS_E$ input of the power supply AND (ii) the testing means simulates a logic level signal at the $PS_E$ input of the power supply AND (iii) the fault indicator indicates that no fault exists in the power supply.

28. A method for detecting a power supply fault in a personal computer comprising:

providing an enabling circuit coupled to a plurality of devices including an ON/OFF control, the enabling circuit to provide a logic level signal in response to the devices indicating they are all working properly and the ON/OFF control being activated;

providing a power supply including a fault detector;

coupling an indicator to the fault detector and the enabling circuit, the indicator supplying a positive indication in response to both no fault being found with the power supply and a logic level signal being received from the enabling circuit;

engaging the ON/OFF control;

observing the indicator;

simulating a logic level signal to the indicator if the indicator provides a negative indication.

* * * * *